Aug. 25, 1964

C. E. SLOOP 3,146,049

ELECTRIC BY-PASS ASSEMBLY

Filed April 27, 1962

INVENTOR.
Clifford E. Sloop

BY

ATTORNEY

Aug. 25, 1964   C. E. SLOOP   3,146,049
ELECTRIC BY-PASS ASSEMBLY
Filed April 27, 1962   2 Sheets-Sheet 2

INVENTOR.
Clifford E. Sloop
BY
ATTORNEY

United States Patent Office 3,146,049
Patented Aug. 25, 1964

3,146,049
ELECTRIC BY-PASS ASSEMBLY
Clifford E. Sloop, 2230 10th St., Columbus, Ga.
Filed Apr. 27, 1962, Ser. No. 190,561
6 Claims. (Cl. 339—12)

This invention relates to an electric by-pass-assembly, and is more particularly concerned with a by-pass for electric meters which will electrically connect two spaced apart terminals.

In the past, meter by-passes have usually taken the form of clips or clamps permanently attached to the meter socket. Many of the by-passes in the prior art require that the meter be removed before the by-pass circuit can be completed. With the great variety of electrical appliances, electrical control circuits, clocks, etc., it is undesirable and frequently inconvenient to have even a brief interruption of electrical service; therefore, it would be desirable to complete the by-pass circuit before removing the meter.

The device of the present invention overcomes the above stated objections by providing a readily installable and easily removable by-pass which does not require clips, clamps or the like, and is easily adaptable to a very wide variety of meter installations. The device is provided with insulated handles by which it may be manipulated with safety.

Briefly, the present invention includes a pair of contact assemblies inter-connected electrically by a cable. Each contact assembly includes an insulated housing surrounding a rigid core having a shank and a core head. The handle of the housing surrounds one end portion of the cable and the core shank which is connected electrically to the cable. Thus, the shank forms a carrying arm disposed within the handle, the lower end of the shank carrying one or a plurality of flat surfaced contact plates of the core head which are adapted to abut the side of a terminal of, say, a meter socket, to provide a circuit from the terminal to the cable. The core head also includes a permanent magnet which is adapted to co-act with the terminal to urge the contact plates into physical and electrical engagement with the terminal. Surrounding the outer sides of the magnet and contact plates is an insulating shield which includes a flat upper bifurcated plate, extending across the upper surface of the magnet, the arms of which extend inwardly and straddle the clamping bolt. The shield body protrudes downwardly from the outer edges of the birfurcated plate adjacent the outer three surfaces of the magnet to terminate below the surface of the magnet. Thus, the operator's hand is shielded from electrical flashes when connecting or disconnecting the contact assembly and the terminal.

It is therefore an object of the present invention to provide a meter by-pass which is attached to the meter socket by means of permanent magnets.

It is another object of the present invention to provide a meter by-pass which may be installed or removed while the meter is in place.

A further object of the present invention is to provide a meter by-pass which is easily adaptable to a wide variety of meter installations.

Another object of the present invention is to provide a meter by-pass which is well insulated so as to be safe for use while the lines are energized.

A further object of the present invention is to provide a meter by-pass which is durable in structure, efficient in operation, and well designed to meet the demands of economic manufacture.

Other and further objects, features and advantages of the present invention will become apparent from the following description when taken in conjunction with the accompanying drawings wherein like characters of reference designate corresponding parts throughout the several views and wherein.

Figure 1:
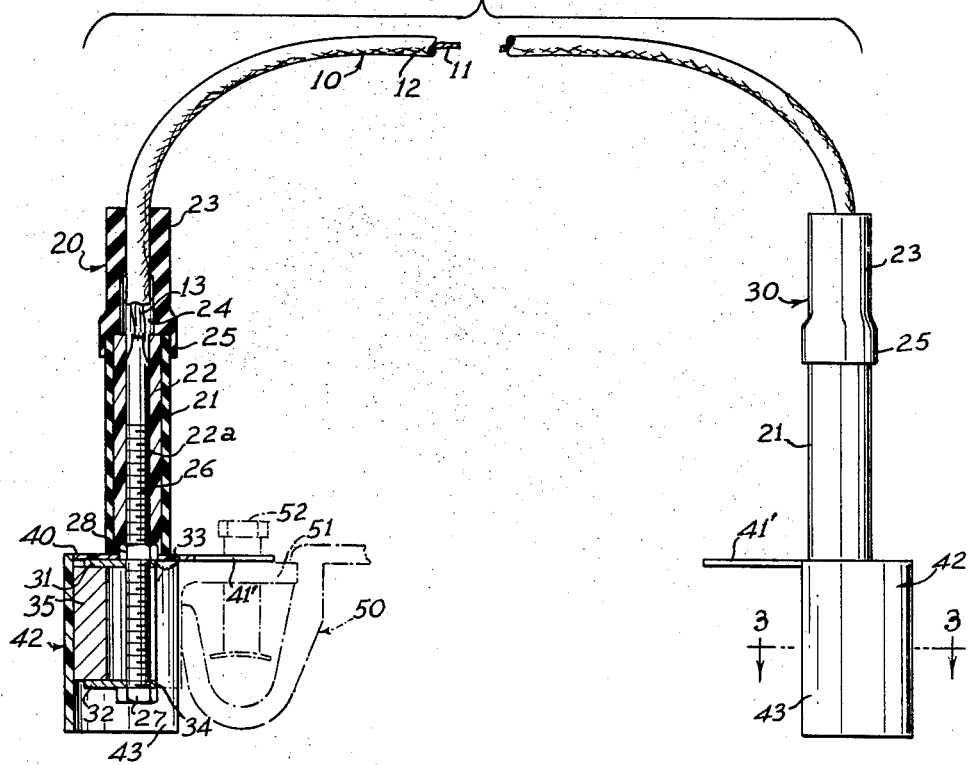
FIG. 1 is a side elevational view of one preferred embodiment of the present invention, with one of the contact assemblies in cross section.
Figure 2:
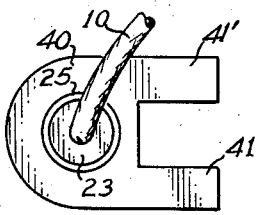
FIG. 2 is a top plan view of one of the contact assemblies of the device shown in FIG. 1.

Referring now in detail to the embodiment chosen for the purpose of illustrating the present invention, it being understood that, in its broader aspects, the present invention is not limited to the exact details herein depicted, numeral 10 denotes generally a cable having a central conductor 11 which is surrounded by insulation 12 except that the end portions, such as end portion 13, of the conductor 11 are exposed for electrical contact.

The end portions of the cable 10 carry the contact assemblies 20 and 30, respectively, the contact assemblies 20 and 30 being substantially identical and hence the interior of only contact assembly 20 is illustrated in the drawings, it being understood that the contact assembly 30 has the same construction.

Contact assembly 20 includes an insulated handle and an electrically conducting magnetic core. The handle includes a hollow cylindrical or tubular body 21, an insulating sleeve 22 within the body 21 and a cap 23 on top of the body 21 and sleeve 22. The cap 23 is a cylindrical member having an axial bore which receives and frictionally retains the end portion of insulation 12. The cap 23 is counter bored to provide a cavity 24 in its lower end portion within which are the end portion of the conductor 11 and the end of insulation 12. The outer periphery of the lower end portion of cap 23 is of larger diameter than the remainder of the cap 23 to provide a depending annular flange 25 which overlaps the upper end of the handle body 21. Thus, the hollow central hole 22a of sleeve 22 is aligned with the cavity 24 and bore of the cap 23.

The upper end of sleeve 22 terminates in the same plane with the upper end of body 21, these upper ends abutting the recessed lower end of cap 23. The lower end of sleeve 22 terminates within the lower end portion of body 21, the body 21 being slightly longer than the sleeve 22 for purposes to be described, hereinafter.

Within the sleeve 22 and protruding below the end thereof, is the contact plate carrying arm of the core, which, in the present embodiment is an externally threaded bolt 26 having a head 27 at its lower end and a nut 28 threadedly received thereon below sleeve 22. Between the head 27 and nut 28 are a pair of flat electrically conducting contact plates 31 and 32. In the present embodiment, the plates 31 and 32 are brass or bronze washers, the inner edges of which are flattened to provide terminal contact surfaces 33 and 34 respectively.

Between the contact plates 31 and 32 and partially surrounding bolt 26 is a U-shaped permanent magnet 35 formed of electrically conducting material. The flat inner surfaces 36 and 37 of each arm of the magnet 35 lie in the same vertical plane with the flat surfaces 33 and 34 of the contact plates 31 and 32.

When nut 28 is tightened against the upper contact plate 31, the plates 31 and 32 firmly clamp the magnet 35 in place.

The upper end of bolt 26 is electrically permanently connected to the end of the conductor 11, by soldering or the like. Thus, it is seen that each element of the core formed by the bolt 26, magnet 35, and contact plates 31 and 32 is in electrical contact with each other element thereof. The back portion of the core head formed by the magnet 35 and the contact plates 31 and 32 is convex along its back surface (flat along its inner face) and has flat vertically disposed parallel sides merging with the back surface. The front surface of the core head is parallel to the axis of bolt 26.

The nut 28 is recessed in the lower end of the body 21 in abutting relationship to the bottom of sleeve 22. Surrounding nut 28 and extending over the upper surface of both contact plate 31 and magnet 35 is a flat bifurcated insulating shield plate 40, the arms 41, 41' of which extend inwardly beyond the inner surface of the core head, for purposes to be described hereinafter.

Figure 3:
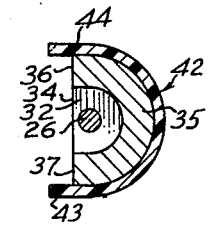
FIG. 3 is a cross sectional view taken on the line 3—3 of FIG. 1.

Depending from the outer edges of the shield plate 40 is a shield body 42, which, as seen in FIG. 3, is a flat rectangular sheet of insulating material curved around the magnet 35. In other words, in cross-section, the shield body 42 is U-shaped, the terminal flange arms 43 and 44 of which extend outwardly contiguous with the sides of magnet 35, inwardly beyond the inner surfaces 36 and 37 of magnet 35. The shield body 42, preferably extends well below the magnet 35, lower contact plate 32 and head 27, as seen in FIG. 1.

The width of magnet 35 is slightly wider than the width of a terminal, such as terminal 50, which receives and clamps a cable (not shown) within a meter box 60.

Figure 4:
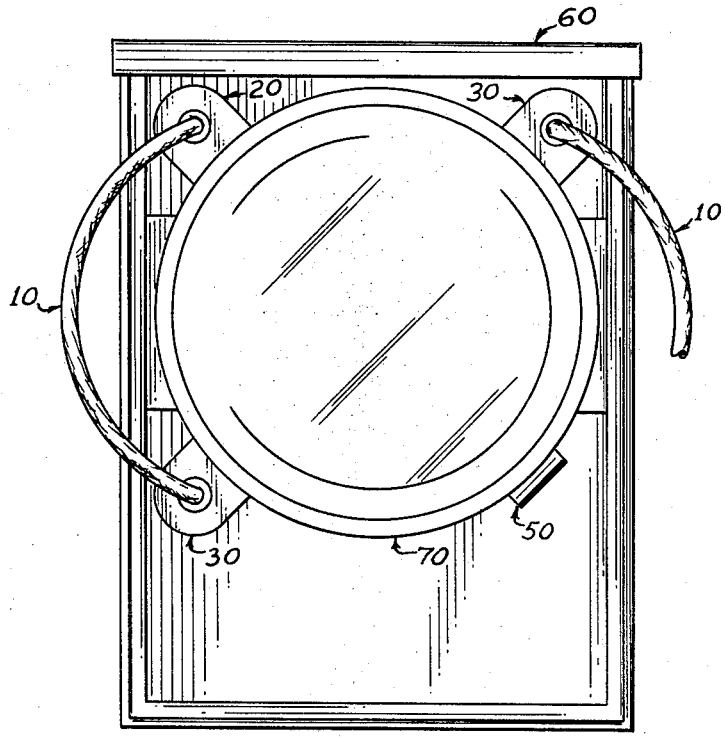
FIG. 4 is a front view of a meter box having the by-pass of the present invention installed therein.

In operation, if it is desired to "jump" a meter, such as meter 70 in FIG. 4, carried by a meter box 60, the maintenance man grasps one of the contact assemblies, say assembly 20 by its handle, i.e. by handle body 21 and rotates the same until the inner surface of the core head, i.e., the surface defined by surfaces 33, 34, 36 and 37, is facing this flat outer surface of one of the terminals 50. Then the maintenance man moves the handle inwardly so that the terminal 50 is attracted to the magnet 35. Since the terminal 50 cannot move, the core head is thereby attracted to the terminal 50 and is moved by the magnetic force inwardly until it contacts and is firmly held against the surface of the terminal 50.

For guiding the magnet to a properly seated position against the side of the cap 51, of terminal 50, the arms 41, 41' are so spaced apart that they may straddle the head or body of the clamping bolt 52 of the terminal 50 as the assembly 20 is brought into registry with the terminal. In like maneuver the flange arms 43, 44 straddle the oposed parallel edges of the outer side of cap 52 and aid in the proper alignment of the core head with the terminal 50.

It will be observed that the outer surfaces of the cap 52 are essentially perpendicular to each other and that, likewise, the inner surface of the core head is essentially perpendicular to the inner surface of arms 41, 41': Therefore when arms 41, 41' are properly seated on cap 52, the surface of the core head should be properly positioned to be seated against the side of cap 52.

In a manner similar to the installation of contact assembly 20, the contact assembly 30 may be installed on another terminal. To remove the contact assemblies, a strong pull may be exerted on the assemblies 20 and 30.

It is significant that since no tools are required for installation of the by-pass assembly and since the meter 70 normally does not overlap the terminals, such as terminal 50, the contact assemblies 20 and 30 may be readily and easily installed on and removed from the terminals, as desired. It is obvious that, for special connections, the handle may be bent or connected to the core head from essentially any angle or other insulated guides may be provided, in place of the guides formed by arms 41, 41' and flange arms 43 and 44.

It will be understood that the surfaces 33, 34, 36, 37 provide a large contact area, and when the core head is adjacent the terminals, their large area is firmly clamped by the magnet 35 to the terminal. Thus, current from a terminal may pass through the magnet 35 and contact plates 31 and 32 into the bolt 26 and thence to the cable 10.

While it is not mandatory, in most instances, at least one of the contact plates 31 or 32 is in electrical contact with the surface of the terminal, thereby giving a wider area of electrical contact between the core head and terminal than merely the magnet surfaces 36 and 37.

The insulating shield essentially covers the contact zone between the terminal and the core head and hence as the by-pass is connected to and disconnected from the terminal any electrical flash is essentially shielded by the shield. Further, there is little danger of a maintenance man receiving an electrical shock from the terminal or a contact assembly 20 or 30 since the necessity of the maintenance man placing his hand close to an exposed portion of the terminal or core head is obviated.

Figure 5:
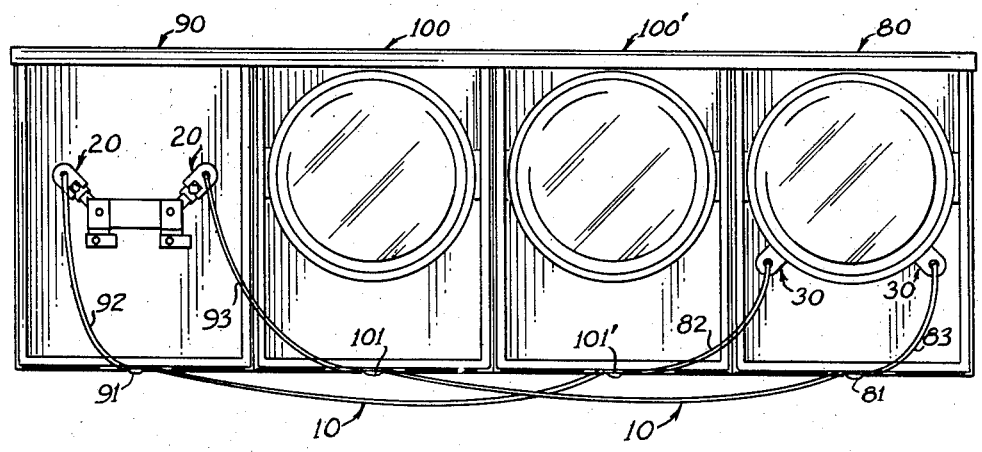
FIG. 5 is a front view of a three meter installation, having the by-pass of the present invention installed on one of the meters.

FIG. 5 shows a multiple meter installation in which a pair of my by-pass assemblies is used to form a by-pass circuit from the entrance box 90 to a meter in box 80, thus spanning boxes 100 and 100'. The relatively long expanse of the cables 10, in such a situation, will cause a greater stress on the assemblies than the magnetic attractive force can hold. To overcome the difficulty, the cover clips 81, 91, 101 and 101' may be utilized to support the cables 10 along their length. When the clips are so used, the only stress on the assemblies 20 is caused by the short cable sections 92 and 93; and, the only stress on the assemblies 30 is caused by the short cable sections 82 and 83. The greatest sections of both cables 10 are completely supported by the clips, as between clips 91 and 101', and between clips 101 and 81.

It will be obvious to those skilled in the art that many variations may be made in the embodiment chosen for the purpose of illustrating the present invention without departing from the scope thereof as defined by the appended claims.

I claim:

1. In a by-pass assembly of the type having a cable and a contact assembly on the end of said cable, the combination wherein said contact assembly including an axially extending metallic core electrically connected to said cable and a housing for said core, said core having a shank and a core head substantially aligned with each other and electrically connected together, said core head having a flat inner side surface for contacting a surface of a terminal and a magnet for urging said flat inner surface into engagement with said terminal, and a housing for enclosing said core, said housing including a handle surrounding said shank and an insulating shield for said core head.

2. In a by-pass assembly of the type having a cable and a contact assembly on the end of said cable, the combination wherein said contact assembly includes a metallic core electrically connected to said cable and an insulating housing for said core, said core including a magnet for urging the side of a portion of said core into engagement with a terminal, said housing enclosing partially said core except for the side of the portion which is for urging into engagement with said terminal.

3. In a by-pass assembly of the type having a cable and a contact assembly on the end of said cable, the combination wherein said contact assembly includes a metallic core electrically connected to said cable, said core having a flat inner surface for contacting a surface of a terminal and a U-shaped magnet surrounding a first portion of said core for urging said flat inner surface into engagement with said terminal, and a housing for enclosing said core, said housing including a handle surrounding the end portion of said cable and a second portion of said core, and guide means for aligning said core and said terminal for registry with each other.

4. In a by-pass assembly, a cable and a contact assembly connected thereto, said contact assembly including a metallic core electrically connected to said cable and having a shank and a core head electrically connected together, said core head having a flat inner surface for contacting a surface of a terminal and a magnet for urging said flat inner surface into engagement with said terminal, and a housing for enclosing said core, said housing including a handle surrounding said shank and an insulating shield surrounding said core head, said shield including a flat bifurcated shield plate and a U-shaped shield body extending from the shield plate over the outer surfaces of said core head, the arms of said shield plate extending essentially perpendicular to said surface of said core head inwardly beyond said inner flat surface for straddling a clamping bolt on said terminal when said core head is aligned and in close proximity to the side of said terminal, said magnet being sufficiently strong to coact with said terminal to hold said inner flat surface in contact with said terminal.

5. In a by-pass assembly, a cable and a contact assembly connected thereto, said contact assembly including a metallic core electrically connected to said cable and a housing for said core, said core having a shank and a core head electrically connected together, said core head having a flat inner surface for contacting a surface of a terminal and a magnet for urging said flat inner surface into engagement with said surface of said terminal, said housing enclosing said core, and including a handle surrounding said shank and an insulating shield surrounding said core head, said shield including a flat bifurcated shield plate radially disposed between said shank and said core, and a U-shaped shield body extending from the shield plate over the outer surfaces of said core head, the arms of said shield plate extending essentially perpendicular to said surface of said core head inwardly beyond said inner flat surface for straddling a clamping bolt on said terminal when said core head is aligned and in close proximity to the side of said terminal, said magnet being sufficiently strong to coact with said terminal to hold said inner flat surface in contact with said surface of said terminal, said shield body having opposed flanges extending beyond said inner flat surface of said core head for straddling said terminal when said core head is contacting said terminal.

6. In a by-pass assembly, a cable having a central conductor and insulation surrounding said conductor, and a contact assembly at one end of said cable, said contact assembly being characterized by a central bolt having a head at its lower end and a nut intermediate its ends, a pair of contact plates between said nut and said head, a U-shaped permanent magnet carried between said contact plates and straddling the lower portion of said bolt, the inner surfaces of said magnet terminating in a plane parallel to the axis of said bolt, an insulated handle surrounding the upper portion of said bolt, a shield plate disposed between said magnet and said handle, said shield plate having a pair of arms extending outwardly beyond said surface of said magnet, a shield body covering the other surfaces of said magnet, the upper end of said bolt being electrically connected to the end of said cable, and a cap on the upper end of said handle through which said cable projects.

References Cited in the file of this patent
UNITED STATES PATENTS

| | | |
|---|---|---|
| 411,093 | Coughlin | Sept. 17, 1889 |
| 1,377,439 | Rice | May 10, 1921 |
| 1,603,171 | Wade | Oct. 12, 1926 |
| 2,204,393 | Barnes et al. | June 11, 1940 |
| 2,526,206 | Dolan | Oct. 17, 1950 |
| 2,706,762 | Alexander et al. | Apr. 19, 1955 |